(No Model.) 2 Sheets—Sheet 1.
O. L. PERIN, D. HORAN & D. McGOEN.
Alcohol Still.
No. 230,333. Patented July 20, 1880.
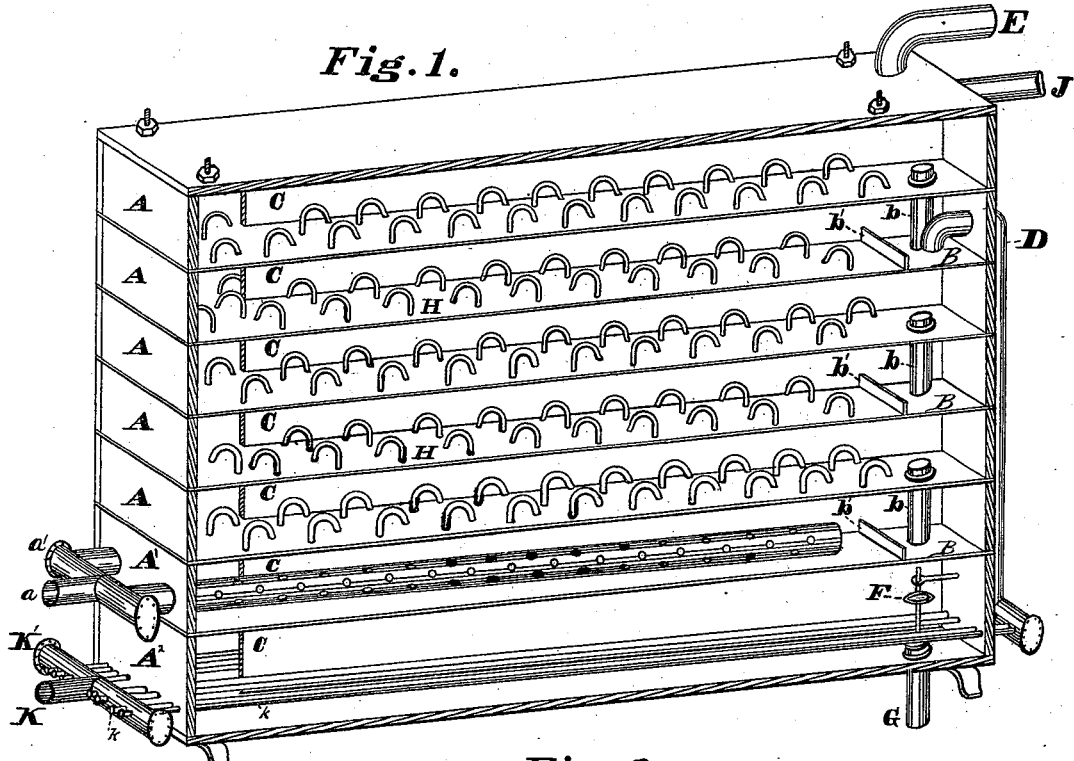
Fig. 1.
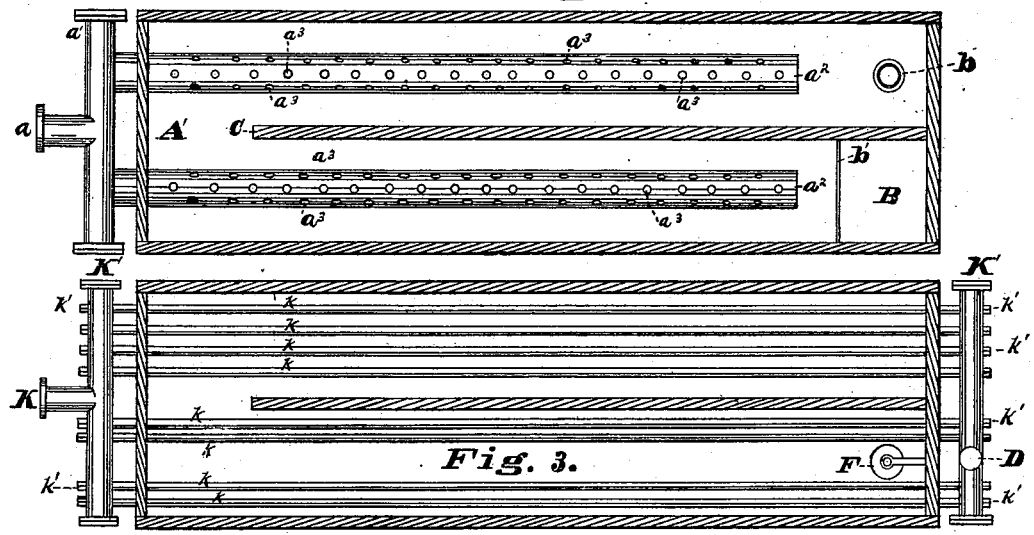
Fig. 2.
Fig. 3.
Attest
Collin Ford Jr.
Wm H. Pugh
Inventors.
Oliver L. Perin
Daniel Horan
Dominick McGoen
By John H. Hill
Atty (No Model.) 2 Sheets—Sheet 2.

O. L. PERIN, D. HORAN & D. McGOEN.
Alcohol Still.

No. 230,333. Patented July 20, 1880.

Attest
Collin Ford Jr
Wm H. Pugh

Inventors.
Oliver L. Perin
Daniel Horan
Dominick McGoen
By John W. Hill
Atty

UNITED STATES PATENT OFFICE.

OLIVER L. PERIN, DANIEL HORAN, AND DOMINICK McGOEN, OF CINCINNATI, OHIO.

ALCOHOL-STILL.

SPECIFICATION forming part of Letters Patent No. 230,333, dated July 20, 1880.

Application filed April 12, 1880. (No model.)

*To all whom it may concern:*

Be it known that we, OLIVER L. PERIN, DANIEL HORAN, and DOMINICK McGOEN, of Cincinnati, in the county of Hamilton and State of Ohio, have invented certain new and useful Improvements in Stills, of which the following is a specification.

The nature of our invention is in an improvement on what are known as "continuous stills," for the distillation of spirituous liquors from beer, mash, or wort; and it consists, first, in the construction of the still with a series of separate chambers arranged one above the other in a vertical stack or pile, each chamber being provided with a novel arrangement and form of steam and spirituous-vapor pipes, and in being further provided with a novel arrangement of beer-pipes and bays, to be fully described hereinafter, by means of which a more complete application of the heat in the steam to the beer or mash is had, with a more economical working of the mash than is possible with continuous stills heretofore in use; and, secondly, in the construction of a slop-chamber in the still containing a surface-heater, by which means the cool beer or mash, as it enters the still, is heated at the expense of the heat in the slop, and the slop is correspondingly cooled before leaving the still.

In stills of this character the beer, mash, or wort, as it is variously termed, is introduced at the top, and the steam for heating the mash is introduced at the bottom of the still.

The application of heat to the mash expels the spirit, and the transfer of heat from the steam to the mash condenses the steam, which flows out at the bottom of the still, along with the residuals of the mash, as slop.

Figure 4:
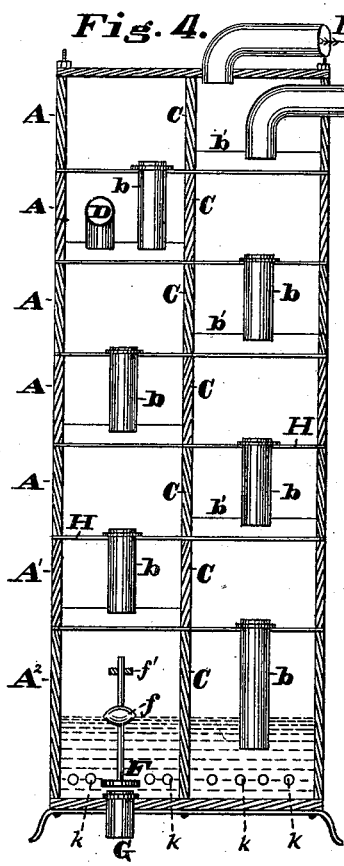
Figure 5:
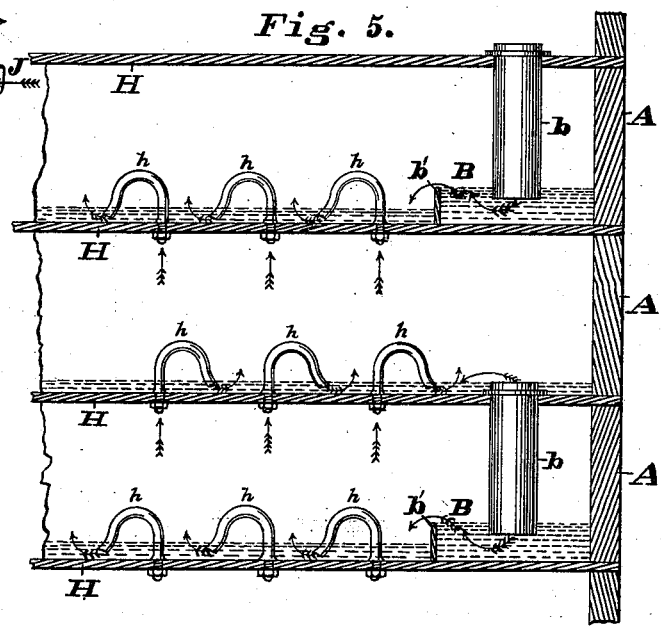
Figure 7:
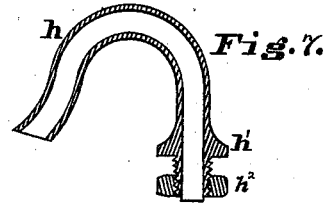
Figure 6:
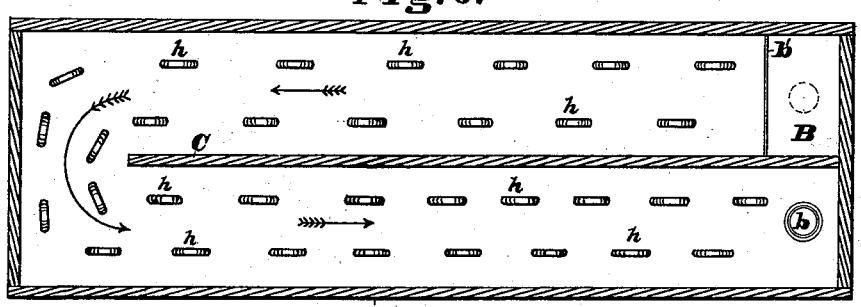

In the accompanying drawings, Figure 1 is a perspective view of our improved still with one side removed to show the internal construction. Fig. 2 is a plan of the steam-chamber. Fig. 3 is a plan of the slop-chamber. Fig. 4 is a vertical section through one end of the still. Fig. 5 is a vertical section through a portion of three chambers of the still. Fig. 6 is a plan of one of the vaporizing-chambers, and Fig. 7 is a vertical section through one of the steam and spirituous-vapor pipes.

Similar letters of reference indicate similar parts.

A A A A are rectangular boxes or chambers, usually made of wood, of which as many as may be necessary are placed one above the other and tied securely together by tie-bolts, as shown in Fig. 1.

H H H are the bottoms of the respective chambers, usually made of copper. C is a partition of wood, extending down the middle of each chamber and separating it into two channels or divisions, one lying upon each side of the axis of the chamber. The partition C joins the chamber A at one end, and approaches nearly to the other end thereof, leaving a passage between the end of the partition and the end of the still equal in width to that of the side channel previously mentioned. The lower edge of the partition C is firmly secured to the bottom H of the chamber, and the upper edge is made flush with the upper surface of the sides and ends of the chamber. B is a small bay, provided at the end of each chamber A, which is formed by placing across the channel, upon one side of the partition C, a weir, $b'$, of copper plate, firmly secured to the bottom H, partition C, and side of the chamber. Into each of the bays B depends, from the chamber next above, a short down-pipe, $b$, the lower end of which is slightly below the crest of the weir $b'$. The upper end of the pipe $b$ projects a slight distance through, and is secured to the bottom H of the chamber next above. D is the beer-pipe, entering the second chamber A at the end of the chamber containing the bay B, as shown in Fig. 1.

E is the vapor-pipe leading from the upper chamber of the still. A′ is the steam-chamber containing the described partition C and bay B. $a$ is the nozzle to which the exhaust-pipe from an engine or the supply-pipe from a steam-boiler is connected. $a'$ is a cross-pipe, connected at the center of its length with the nozzle $a$, and near the ends with the perforated distributing-pipes $a^2 a^2$.

The pipes $a^2 a^2$ are nearly as long as the chamber A′, as shown in Fig. 2, and are usually made oval in cross-section, with the longest diameter placed horizontally.

The perforations $a^3$ $a^3$ are usually limited to the upper half of the periphery of the pipe $a^2$, and the remote end of the pipe is closed, thus forcing all steam to escape through the perforations $a^3$ $a^3$ $a^3$.

$A^2$ is the slop-chamber, containing the described partition C, but no bay. F is an ordinary float and valve mounted over the slop-pipe G, to regulate the flow of slop from the chamber. K is the nozzle into which the beer or mash is pumped from the customary beer-cistern. K' K' are cross-pipes or manifolds, one at each end of the chamber $A^2$, into which are screwed the ends of the heater-pipes $k$, $k$, $k$, and $k$.

The pipes $k$, $k$, $k$, and $k$ extend entirely through the chamber $A^2$, as shown in Fig. 3.

$k'$ $k'$ $k'$ are screw-plugs tapped into the cross-pipe K' K', which can be removed for the purpose of cleaning the pipes $k$ $k$ $k$. J is a pipe connected with the upper chamber of the still, through which the low-wines are introduced to be worked over. $h$, $h$, $h$, $h$, and $h$ are curved pipes of copper or brass, provided with a shoulder, $h'$, and screw-thread and nut $h^2$, as shown in Fig. 7, by means of which they are attached to the bottom of each of the compartments or chambers A, as shown in Fig. 5.

The outlet or mouth of the pipe $h$ is bent slightly outward from a perpendicular and set in the direction of the flow in the several chambers A.

The several connections from the pipe K to the beer or mash pump, the pipe $a$ to the exhaust-pipe from an engine or to a steam-pipe from a boiler, the pipe E to the cooling-worm of the still, and the pipe J to the low-wines pump being made, the operation of the still is as follows: The beer or mash flows through the pipes K, K', $k$, $k$, $k$, and $k$, K', and D into the second chamber A from the top of the still, and debouches into the bay B, into which the end of the pipe D is turned. The beer or mash overflowing the weir $b'$ of the bay, travels over the bottom or floor H of the chamber, down one side or channel of the chamber, around the end of the partition C, and up the other channel of the chamber to the down-pipe $b$, through which it flows into the bay B and over the weir $b'$ of the next chamber A below.

While the beer or mash flows through the chambers A steam flows into the chamber A' by means of the pipes $a$ $a'$ and $a^2$ $a^2$ and perforations $a^3$, $a^3$, and $a^3$, and finally through the curved pipes $h$ $h$ $h$ into the next chamber A above.

The mixture of steam and spirituous vapor in the lower chamber A passes up through the curved pipes $h$ $h$ $h$ into the next higher chamber A, and so on, to the upper chamber of the still, where the spirituous vapor is drawn off through the vapor-pipe E, connected with the cooling-worm, and the steam, having been condensed, passes down through the still with the beer or mash.

The distance from the upper surface of the floor or bottom H of the several chambers A to the upper edge of the down-pipe $b$ being greater than the distance between the mouth of the pipe $h$ and the floor H, it follows that the mouth of the pipe $h$ is always immersed in the flowing mash, and that the delivery of steam and spirituous vapor is always under the surface of the mash. The downward and forward curve of the pipe $h$ insures a complete heating of the mash as it is driven forward in the still. The operation of one chamber is precisely like that of all the chambers, the beer or mash flowing down from the next chamber above through the down-pipe $b$ into the bay B, over the weir $b'$, and down one channel and up the other channel of the chamber A to the next down-pipe $b$, and so on throughout the entire system of chambers, while the steam and spirituous vapor ascend from the next chamber below, through the curved pipes $h$, $h$, $h$, and $h$.

After the mash or beer has been heated in the chamber A' it is supposed that all the spirit has been expelled therefrom, and the residuals of the mash and the condensed steam flow into the slop-chamber $A^2$. The height or level of slop in this chamber being constantly maintained at some point over the heating-tubes $k$, $k$, $k$, and $k$, by means of the float and valve F, the slop is drawn from the down-pipe $b$ in the chamber A', down one side and up the other side of the partition in the chamber $A^2$ to the outlet-pipe G, from which it is conveyed to the customary cooling-tubs.

The passage of the heated slop through the chamber $A^2$ permits of a material elevation of the temperature of the beer or mash, with a corresponding reduction of the temperature of the slop, thus materially economizing steam in the operation of the still by utilizing the heat in the slop, which would otherwise be wasted.

The use of the upper chamber A of the still for the working over of the low-wines dispenses with the usual doubler.

It is obvious that any desired quantity of spirit can be had by simply adding to the number of chambers above the chamber A', and that any desired number of chambers may be used for working over the low-wines by introducing the beer or mash into the next lower chamber A.

We are aware that continuous stills are old and well known, and that our invention is limited to the devices $h$, H, C, $b$, B, $b'$, K', K', $k$, $k$, $k$, and $k$, and F, or their equivalents, for the purpose described.

Having described our invention, what we claim is—

1. In a continuous still, the combination, with a vertical series of channels or chambers having bottoms H and partitions C, made less in length than the length of the chambers or channels, of the weirs $b'$, to form bays B, the down-pipes $b$, leading from alternately-opposite ends of each bottom to near the next lower bottom, the curved vapor-pipes $h$, arranged in each of said bottoms, a beer or mash pipe leading into the upper chamber, and a steam-pipe opening under the bottom of the lower chamber, substantially as described.

2. In a continuous still, the combination, with the vertical series of chambers A, having partitions C and bottoms H, provided with weirs $b'$ to form bays B for directing the flow of beer or mash from one end toward the other of each channel, of the down-pipe $b$, leading from one end of each bottom into the bay of the next below, the curved vapor-pipes $h$, arranged in each bottom and turned to discharge in the direction of the flow of beer or mash thereon, a beer-pipe, D, leading into the upper channel, a vapor-pipe, E, leading therefrom, and the steam-pipes $a$ $a'$ $a^2$, arranged to discharge steam under the bottom of the lowest channel, substantially as set forth.

3. In a continuous still, the combination, with one or more channels or chambers having bottoms provided with curved vapor-pipes $h$, of the chamber A', the perforated steam-pipes $a^2$ $a^2$, arranged therein, the cross-pipe $a'$ and nozzle $a$, and a beer-pipe and vapor-pipe leading from the top chamber, substantially as described.

4. In a continuous still, the combination, with a vertical series of channels or chambers constructed and arranged as described, of the lower chamber, $A^2$, pipes K, K', $K^2$, and $k$, and float F, substantially as and for the purpose set forth.

5. In continuous stills, the combination of the chambers A, A, A, and A, the chamber A', and the chamber $A^2$, with the mash inlet-pipe K, steam-pipe $a$, vapor-pipe E, and slop-pipe G, for the purpose and as described.

In testimony whereof we have signed our names to the foregoing specification in the presence of two subscribing witnesses.

OLIVER L. PERIN.
DANIEL HORAN.
DOMINICK McGOEN.

Witnesses:
A. L. Ross,
Collin Ford, Jr.